United States Patent  
Duhault

(10) Patent No.: US 6,456,334 B1
(45) Date of Patent: Sep. 24, 2002

(54) METHOD AND APPARATUS FOR DISPLAYING VIDEO IN A DATA PROCESSING SYSTEM

(75) Inventor: James P. Duhault, Toronto (CA)

(73) Assignee: ATI International Srl, Barbados (KN)

( * ) Notice: Subject to any disclaimer, the term of this patent is extended or adjusted under 35 U.S.C. 154(b) by 0 days.

(21) Appl. No.: 09/343,064

(22) Filed: Jun. 29, 1999

(51) Int. Cl.$^7$ ................................................ A04N 5/45
(52) U.S. Cl. ...................................... 348/565; 348/564
(58) Field of Search ............................... 348/565–568, 348/564, 563, 569, 581, 731, 732; H04M 5/445, 5/44, 5/45

(56) References Cited

U.S. PATENT DOCUMENTS

| | | | | |
|---|---|---|---|---|
| 5,900,868 A | * | 5/1999 | Hahault et al. | 348/564 |
| 5,969,769 A | * | 10/1999 | Hamadate | 348/568 |
| 6,118,493 A | * | 9/2000 | Duhault et al. | 348/564 |
| 6,204,887 B1 | * | 3/2001 | Hiroi | 348/565 |

OTHER PUBLICATIONS

Patent Application Information Sheet—Method and Apparatus for Multiple Channel Display; 08/831,072; Filed Apr. 1, 1997.

Patent Application Information Sheet—Method and Apparatus for Selecting a Channel From a Multiple Channel Display; 08/831,072; Filed Apr. 1, 1997.

* cited by examiner

*Primary Examiner*—Michael H. Lee
(74) *Attorney, Agent, or Firm*—Vedder, Price, Kaufman & Kammholz

(57) ABSTRACT

In one embodiment of the present invention, a plurality of video images are displayed on a scalable window associated with a computer device. One of the first portion of the plurality of images is updated by a first tuner, a second portion of the plurality of images is updated by a second tuner. By selecting one of the plurality of images using a first method, the selected image can be viewed in full-motion-video. By selecting an image using a second selection method, the image can be viewed in full-motion-video for only a predetermined amount of time. By selecting the image in yet another selection method, a second window can be created whereby a larger image of the thumbnail image can be viewed in full-motion-video. Yet another video image can be selected in order for the audio associated with that video to be played. Images being monitored in slow motion video may be relegated to the status of a thumbnail through various selection methods. Likewise, thumbnail images may periodically be viewed in full-motion-video mode.

30 Claims, 10 Drawing Sheets

METHOD AND APPARATUS FOR DISPLAYING VIDEO IN A DATA PROCESSING SYSTEM

RELATED APPLICATIONS

A co-pending application entitled "Method and Apparatus For Multiple Channel Display", having application number 08/831,072, was filed with the United States Patent Office on Apr. 1, 1997, has at least one inventor in common, and is assigned to the assignee herein.

A co-pending application entitled "Method and Apparatus For Selecting A Channel From A Multiple Channel Display", having application number 08/831,292, was filed with the United States Patent Office on Apr. 1, 1997, has at least one inventor in common, and is assigned to the assignee herein.

BACKGROUND OF THE INVENTION

The concept of picture-in-a-picture with modem televisions is well known. Picture-in-a-picture capabilities allows viewers to monitor two channels simultaneously by using a second tuner to display a second, usually smaller, window within display. Generally, the main picture is controlled by a first tuner, while the smaller picture-in-a-picture video is displayed via a second tuner. For individuals desiring to monitor more than two programs simultaneously, this prior art solution has its limitations.

Other modem televisions, and computers, have the ability to display a grid of images representing snapshots, or thumbnails, of multiple channels that are periodically updated. While such an implementation of video processing allows one to monitor multiple channels, the images are updated infrequently and result in a choppy picture.

Therefore, while additional channels can be monitored, often the information is not useful. In addition, the methods utilized to switch back and forth between the thumbnail mode to a regular TV picture are often fixed and burdensome.

Therefore, prior art picture-in-a-picture (PIP) solutions with television and computers, have limited users to viewing a fixed number of small choppy images, or a single PIP window. Therefore, a flexible method of controlling the display of video to overcome the problems discussed herein would be advantageous.

DETAILED DESCRIPTION OF THE DRAWINGS

A method and system for displaying video is disclosed, wherein multiple tuners are used to display multiple video images within a scaleable window such as would be associated with a computer system. One tuner provides full-motion-video to a first image, which is generally a larger image residing within the entire window. A second tuner provides periodic refreshing to the other generally smaller windows. Selection of the smaller windows allows for periodic full-motion-video, individual full-motion video, switching of location, audio feed, and other desirable manipulation of the various images. The images can be contained within one or more scaleable windows.

The present invention is best understood with reference to FIGS. 1–11. Specifically, FIGS. 1–4 represent display devices illustrating particular aspects of the present invention. FIGS. 5–10 represent various methods in accordance with the present invention and will be discussed with reference to FIGS. 1–4.

Figure 1:
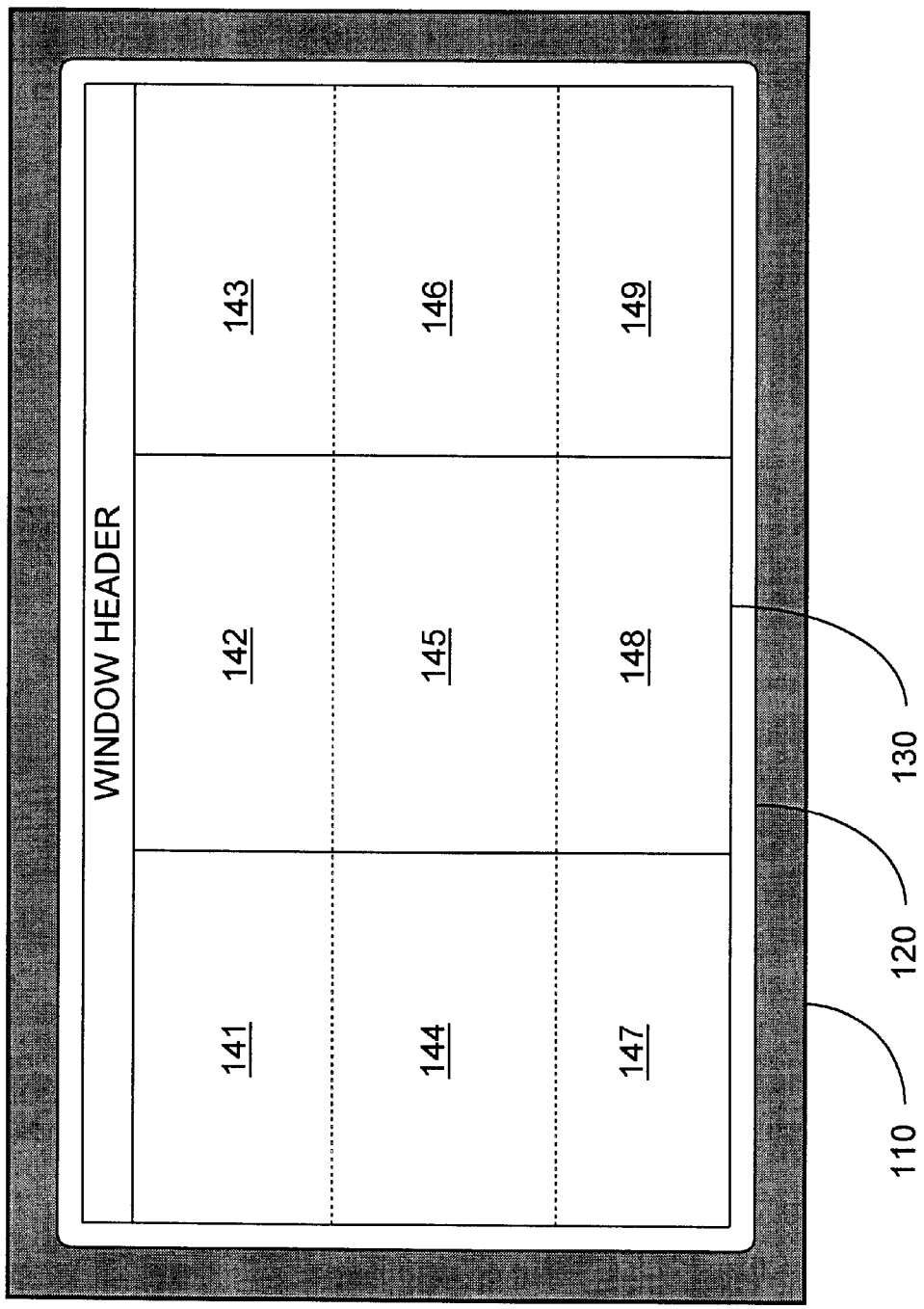
FIG. 1 illustrates a display device having a plurality of video images.

FIG. 1 illustrates a display device 110, such as a computer monitor or television screen, that is displaying a window 130 within the screen area 120 of the display device. In the embodiment of FIG. 1, the window 130 takes up substantially all of the screen 120 space. However, the window 130, is scalable, in that the window is associated with a data processing device capable of supporting variable window sizes. One of ordinary skill in the art will recognize that the display device can be driven by a variety of processing devices such as laptop computers, workstations, handheld devices, or any other device wherein window scalability would generally be found. In the implementation of FIG. 1, the window 130 has a window header, and nine video images 141–149 displayed. Other implementations may not have a window header, or may have more of fewer video images displayed.

Figure 2:
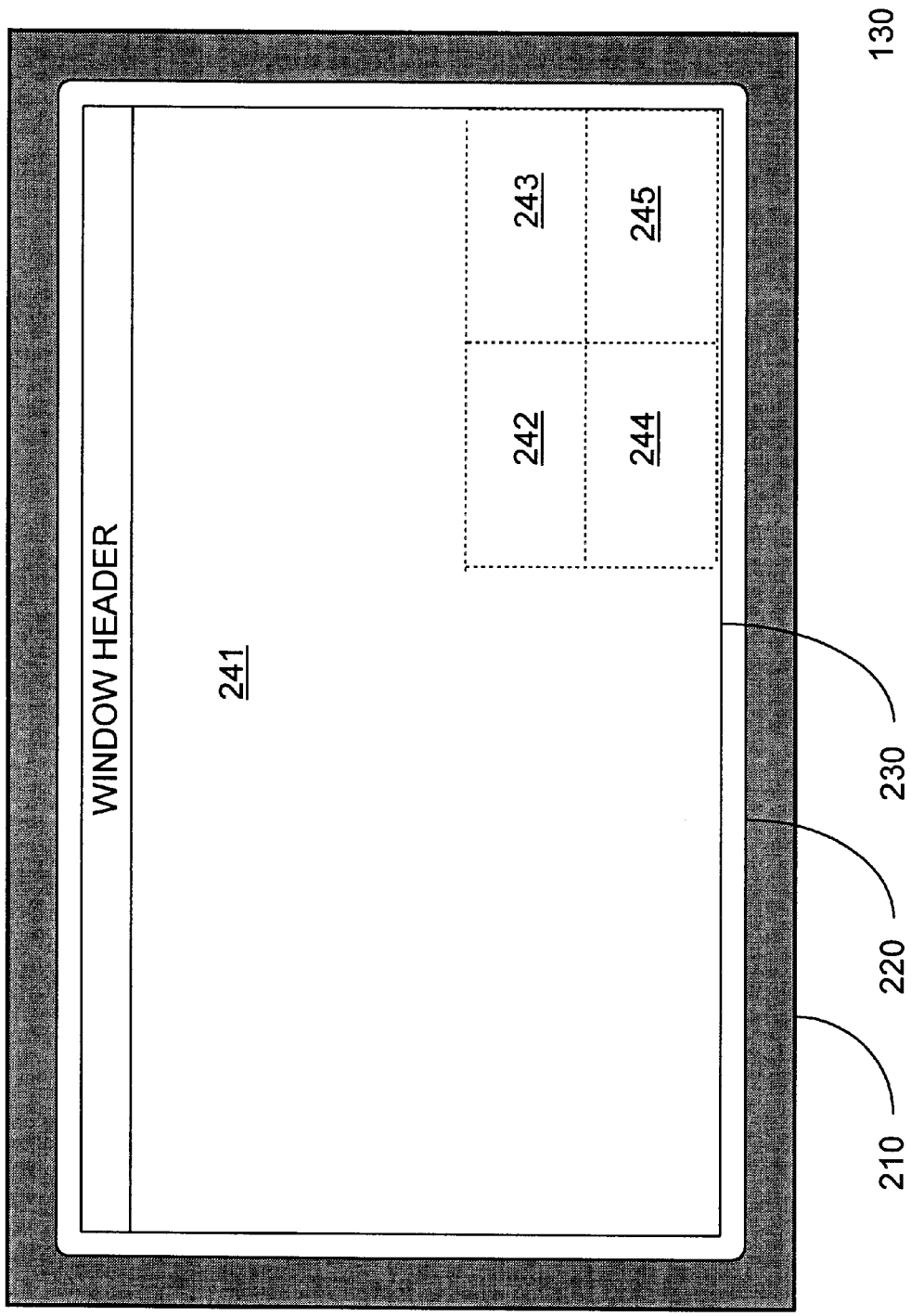
FIG. 2 illustrates a display device having a plurality of video images.

FIG. 2 illustrates another display device 210, having a window 230 implementing another specification implementation of the present invention. Specifically, the window 230 of FIG. 2 also comprises a window header, a large image 241, and four smaller images 242–245. In accordance with the present application, the term "thumbnail" will be used to refer to any smaller video image within a window. For example, the video images 242–245 of FIG. 2 will be referred to as thumbnail images. Likewise, the images 141–149 of FIG. 1 would also be referred to as thumbnail images, in that they are considerably smaller than the window in which they are contained.

Figure 3:
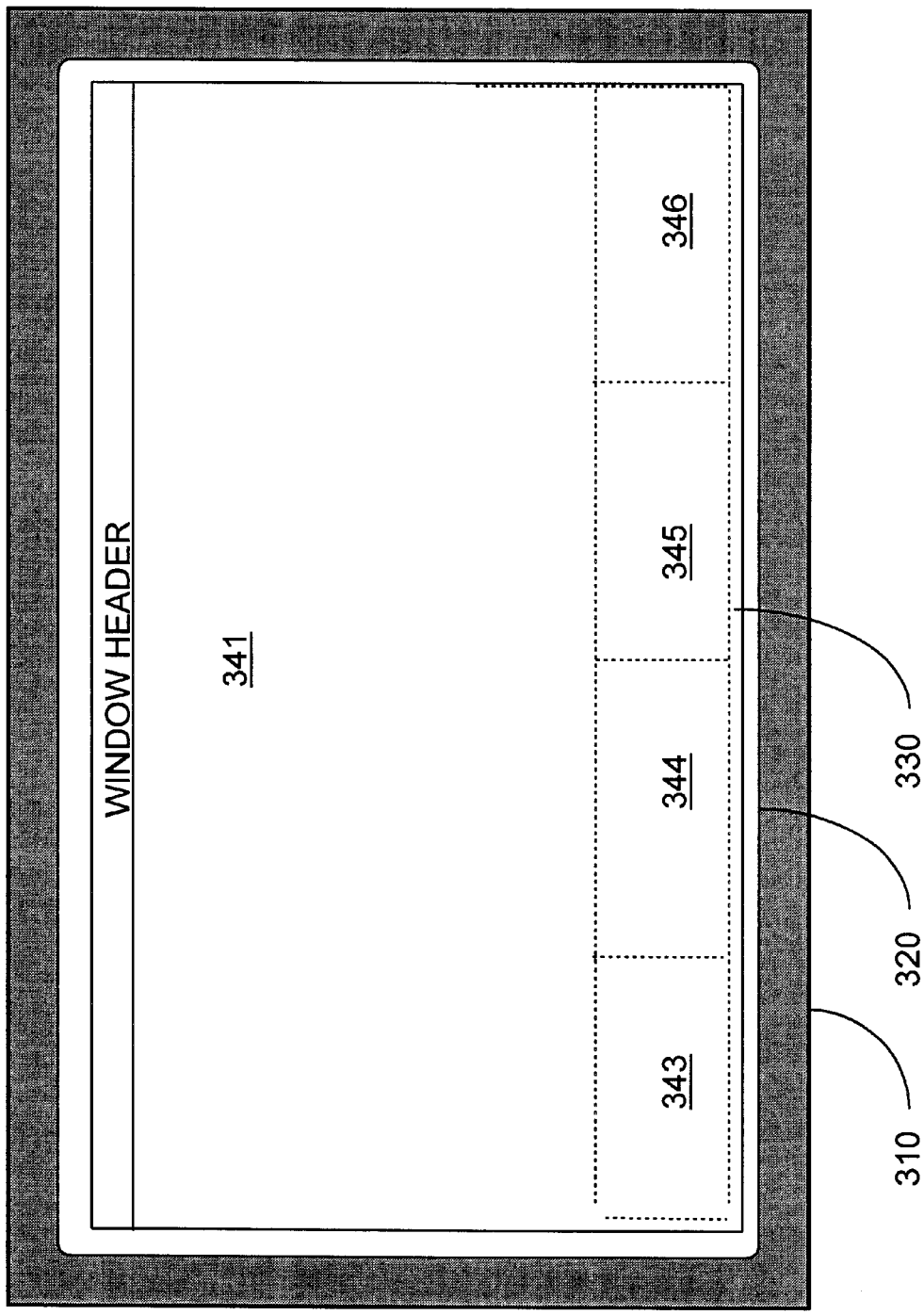
FIG. 3 illustrates a display device having multiple windows representing a plurality of video images.

FIG. 3 illustrates a slightly different implementation of the video images of FIG. 2. Specifically, instead of having the thumbnail video images formed in the lower right quadrant of the window as illustrated in FIG. 2, the thumbnail images are maintained along an edge of the window. FIG. 3 illustrates the images along the bottom, however, the image can be supported along the top or either side of the window 330.

Figure 4:
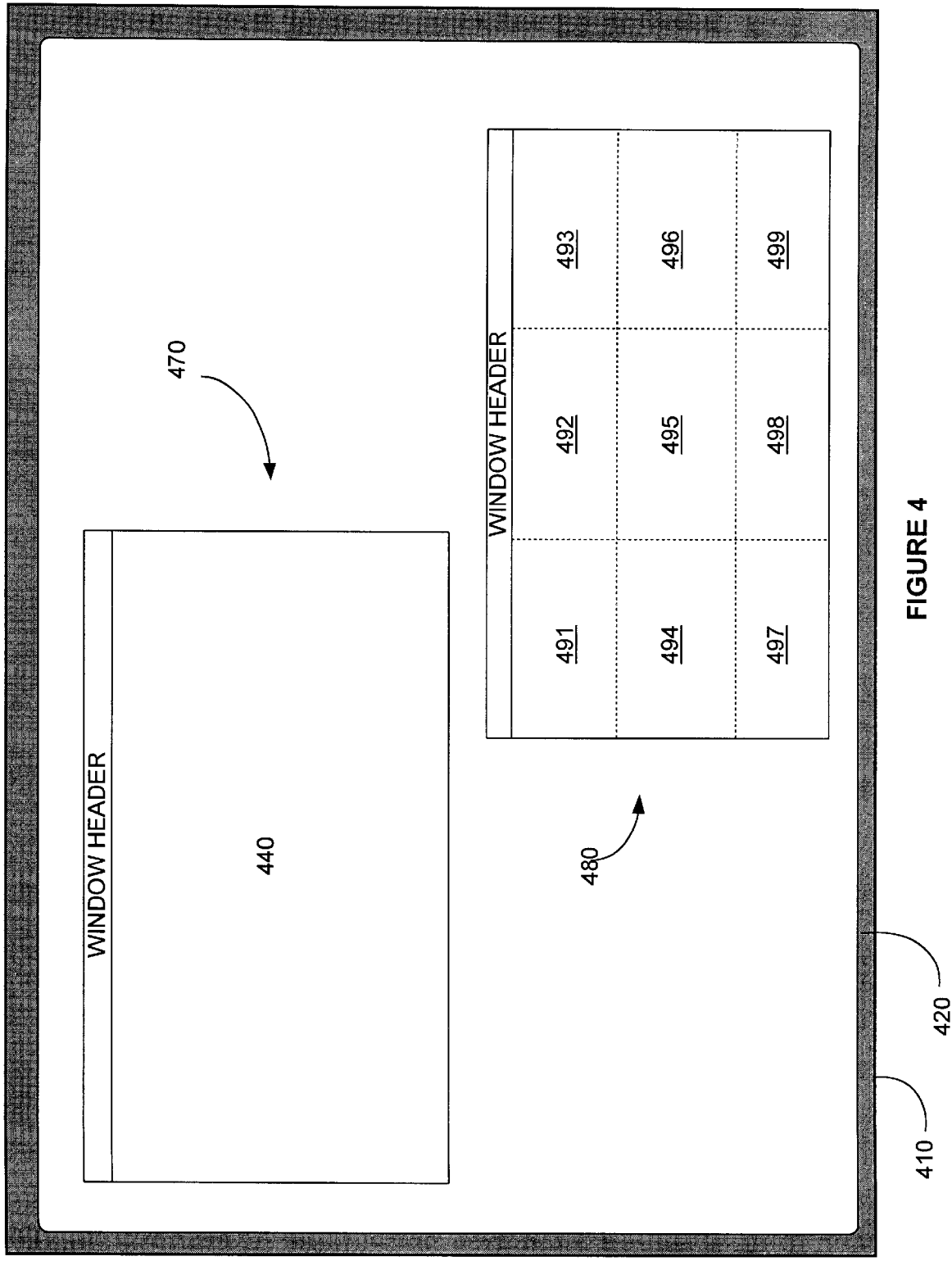
FIG. 4 illustrates a display device having a plurality of windows representing a plurality of video images.

FIG. 4 illustrates an implementation of the present invention wherein two windows 440 and 480 reside within the screen area 420. In the specific implementation of FIG. 4, the window 440 would contain a single image to be displayed, while the window 480 comprises 9 images 491–499 for display. In other embodiments, the windows 440 and 480 can reside on separate viewing devices that are commonly controlled by a user.

The specific invention, as it relates to the windows and images of FIGS. 1–4 are best described in reference to the methods of FIGS. 5–10.

At step 410, the plurality of video images is displayed simultaneously within a scalable first window. With reference to FIGS. 1–4, the plurality of video images include the images 141–149 of FIG. 1, the images 242–245 of FIG. 2, the images 443–446 of FIG. 3, as well as the images 491–499 of FIG. 4. The term "a video image" generally refers to a unique channel of video being displayed within the scalable first window. For example, referring to FIG. 1, video image 141 can represent one television channel while video image 142–149 would represent eight other television channels. In addition to traditional television channels, the video images can represent analog or digital signals received from satellites, cable networks, or digitally across the Internet, or other on-demand video type devices.

At step 411, a first portion of the plurality of video images is periodically refreshed using a first tuner. Referring to FIG. 1, all or none of the video images 141–149, can be represented within the first portion of the plurality of video images as recited in step 411. For example, video images 142 through 149 can be selected to be within the first portion of the plurality of video images. These eight video images will then be periodically updated using a first tuner in accordance with step 411. By periodically updating the images using a first tuner, it is possible to monitor a plurality of channels simultaneously. Likewise, the first portion of step 411 can represent a different portion of the images of window 130 can be selected.

At step 412, a second portion of the plurality of video images are identified, and periodically refreshed using a second tuner. In the example discussed with reference to step 411, where video images 142 through 149 represent a first portion, the video image 141 can represent a second portion of a plurality of video images. In this situation, the video image 141 will be periodically refreshed at a full-motion-video rate. Full-motion-video refers to the rate at which video appears to be continuous to the viewer, or at least the rate at which a viewer can watch video without distracting unnatural motions occurring.

However, in other implementation of step 411, it is possible for the first portion of the plurality of video images to include video images 141–144, while the second portion of the plurality of the video images would include the other five images 145–149. In this embodiment, each tuner would be updating a plurality of video images, whereby none of the video images being refreshed would qualify as full-motion-video.

By allowing multiple tuners to control video images within a common window, it is possible to have the flexibility of a scalable window such as found on modem computer systems, with the flexibility to be able to monitor multiple programs at one time. In other words, it is possible for a user to control the size of the window 130 of FIG. 1 in order to meet the individual needs.

Following step 412, the flow continues to one or all of the methods of FIG. 6, FIG. 7, FIG. 8, or FIG. 9. The specific methods of FIGS. 6–9 are not necessarily mutually exclusive, in that the various methods may be implemented simultaneously with one another or sequentially as appropriate. The specific methods discussed with reference to each of FIGS. 6–follow.

Figure 5:
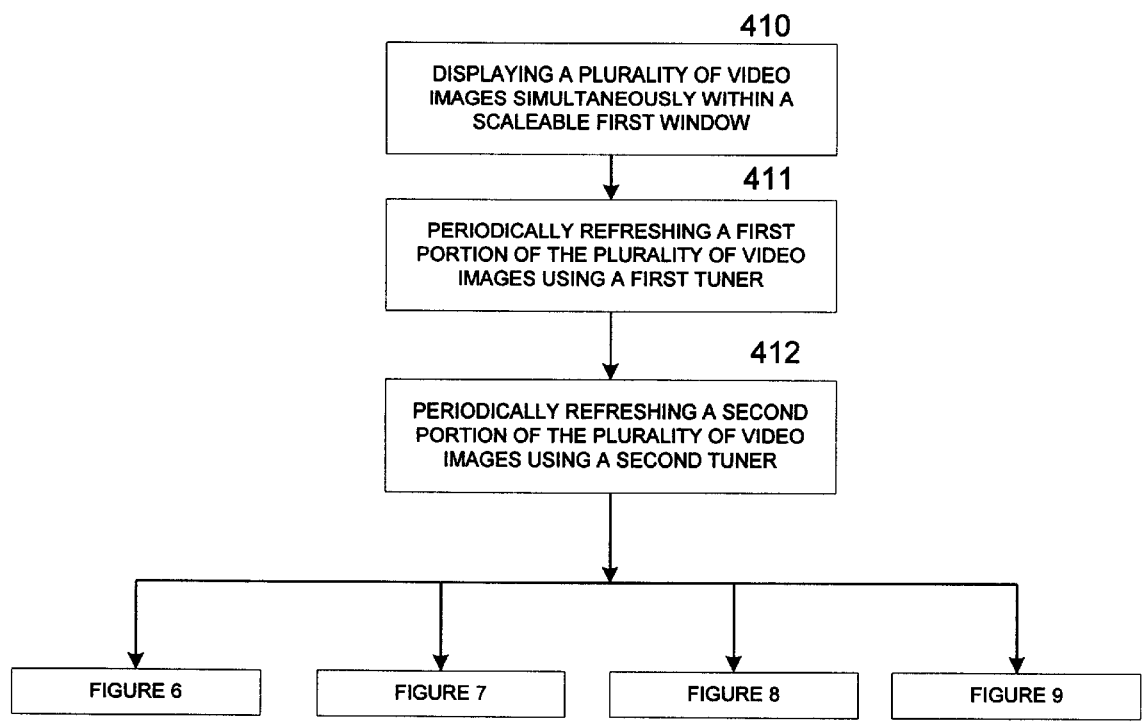
FIGS. 5–10 represent methods illustrating specific embodiments of displaying multiple video images in accordance with the present invention.
Figure 6:
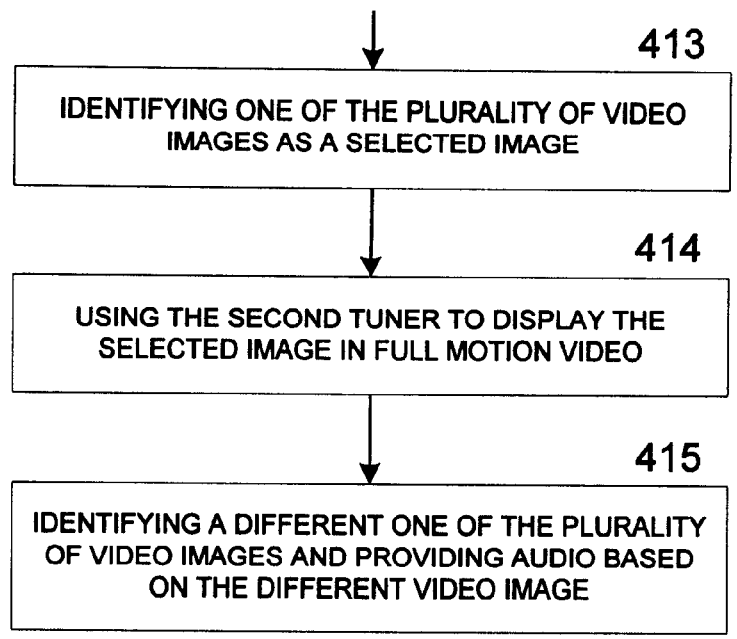

The method of FIG. 5 continues at step 413 of FIG. 6. At step 413, one of the plurality of video images is identified as a selected image. In one embodiment, the selected image is identified through a graphics user interface (GUI). For example, one means of identifying the selected image is to point and click on the image desired.

Another method of selecting an image is to scroll through the screens, for example by using the tab or arrow keys, until the desired screen is highlighted. In addition, other methods of selecting images will be discussed herein. At step 414, the second tuner is used to display the selected image from step 413 in full-motion-video.

For example, if a user desired to watch the video image 146 of FIG. 1 in full-motion-video the user would select the video image 146 by pointing a cursor at the image and clicking. In addition, other functions or key combinations can be used with the click to select image 146. For example, the user can program specific function keys or other key strokes to correspond to varying images within the windows of the display device. This is advantageous over the prior art, in that a simple input, such as a keystroke or a GUI selection can be used in order to provide full-motion-video to one of the images displayed within the scale of a window.

In the specific embodiment discussed, the second tuner is used to implement the full-motion-video of the selected video image. In order to accomplish this, it is necessary for the second tuner to dedicate enough processing resources to the selected video image in order to assure full-motion-video is achieved. In some implementations this will require the second tuner to dedicate all of its bandwidth to the full-motion-video image, and suspend updates to any other images associated with the second portion of the plurality of windows. When the second portion of windows is no longer to be updated by tuner 2, it will be necessary for the windows to either remain static, i.e., not be refreshed, or to be updated by tuner 1. This choice may be predetermined or it could be a user-programmable option.

At step 415, a different one of the plurality of windows is identified as a second selected window. The audio from the second selected window, or the different window, is provided. In other words, it is possible to be viewing a first of the plurality of windows in full-motion-video mode, while listening to the audio content associated with a second of the video images. In this manner, it would be possible for the viewer to watch a sports event in full-motion-video while listening to the audio content of a second video channel, such as a concert. Another option is to play the audio content of both the selected channels simultaneously. In situations where sporting events and video images of other types of programming are being monitored, it may be possible for the viewer to distinguish between the various audio feeds in order to listen to them simultaneously. This represents an advantage over the prior art in that the user is able to use multiple senses in order to distinguish between events that are occurring. In other words, it is not necessary for a viewer to monitor nine windows by visual means alone. Specific windows can have their audio feed played, allowing audible, as well as visual, perception to be used by a view/listener.

Figure 7:
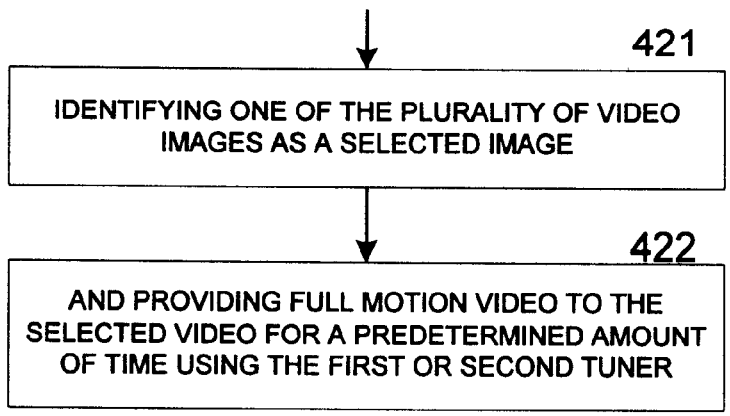

FIG. 7 illustrates another set of options that can be selected from step 412 of FIG. 5. Specifically, at step 421, one of the plurality of images is identified as a selected imaged in the same manner as discussed with step 413.

At step 422, full-motion-video is provided to the selected video as in the manner discussed with reference to step 414. However, at step 422, the full-motion-video is maintained at the selected video image for only a predetermined amount of time using the second tuner. In other words, when a user selects one of the images of FIG. 1, such as image 149, the selected video image would be played in full-motion-video for only a predetermined amount of time, such as 10 seconds. During this time, the other windows can be updated by the first tuner, or not be refreshed at all, while the second tuner refreshes the image 149 at a full-motion-video rate.

With reference to FIG. 2, when image 245 is selected, it can be refreshed in thumbnail form at a full-motion-video rate, while the other images would either remain stale, or be updated at a lower rate. For example, the image 245 could be refreshed in its indicated location by the second tuner, while the image 241 remains idle or is refreshed periodically by the first tuner.

In another embodiment, image 245 would be refreshed by the first tuner, and images 242–244 would be idle, while image 241 is maintained by the second tuner in a normal manner.

In another embodiment, a second selection type, such as a shift-click, or other unique predefined selection method, can be used to switch the image 245 into the location of the larger image 241, while the image 241 would be reduced to the location of thumbnail 245.

In any of the embodiments of FIG. 7, the video image 245 is played back for a predetermined amount of time in full-motion-video. At the end of the predetermined time, such as 10 seconds, the windows would switch back to their original positions and refresh rates.

In other modes of operation, it would be possible for each of the video images 241 through 245 of FIG. 2 to periodically be played back at full-motion-video either in the place of video image 241, or in their own respective locations. In this manner, users would be given more flexibility to closely monitor content of individual programs, while maintaining ability to watch any one program at least in slower refresh form at the same time. With reference to the step 415 previously, in section alternating full-motion-video mode, it would be possible for the audio feed from the window occupying the larger portion of the screen to be played, it would be possible for a specific audio feed of a specific video image to always be played regardless of its location in the window, or the full-motion-video image can have its audio played.

Figure 8:
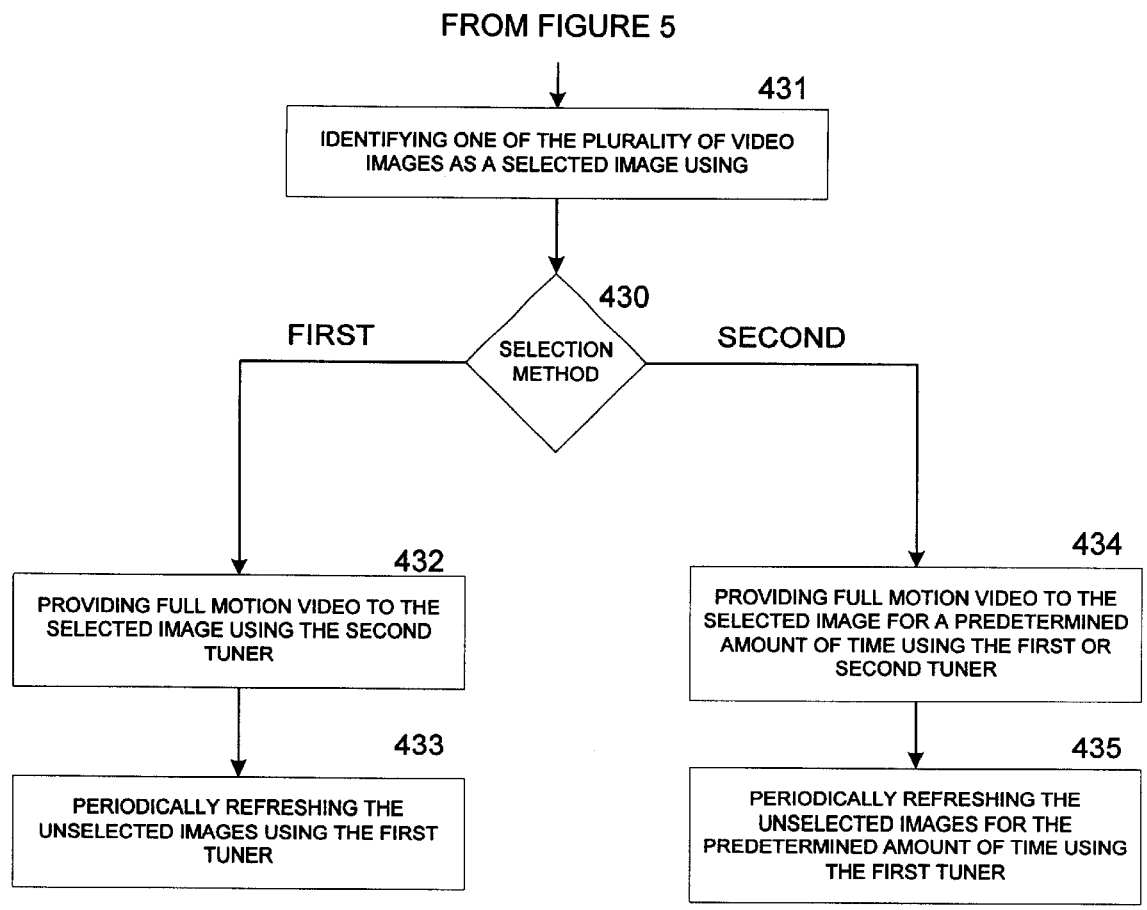

The method of FIG. 8 follows step 412 of FIG. 5. At step 431, one of the plurality of video images is selected as described with reference to step 413 previously.

At step 430, a determination is made as to what selection method is used. When a first selection method is used, such as when a user clicks on specific image using a shift key and the mouse, the flow would proceed to step 432. When a different unique set of selection criteria is used, the flow will proceed to step 434.

At step 432, full-motion-video is provided to the selected image using the second tuner in the manner previously discussed. At step 433, the unselected images are periodically updated using the first tuner, also in the manner previously discussed. In an alternate embodiment, the unselected images from the same portion as the selected image are not refreshed.

At step 434, when a second selection method is used, the full-motion-video is provided to the selected image for a predetermined amount of time using the second tuner. At step 435, the unselected images are periodically refreshed by the first tuner, or left unrefreshed.

FIG. 8 illustrates how multiple selection methods can be used to implement varying implementations of the present invention. In other words, in the method of FIG. 8, when a first selection method is used full-motion-video is provided using a second tuner to a specific image. In this instance, the full-motion-video picture would be maintained. Referring to FIG. 2, when selected, image 245 would take the location of image 241, while the image 241 would be shrunk to thumbnail size and located where image 245 is illustrated. When a first selection method is used, the image 245 would remain on the large screen. However, when a second selection method is used, the functionality would be such that the thumbnail picture would be displayed in full-motion-video for only a predetermined about of time as previously discussed.

Figure 9:
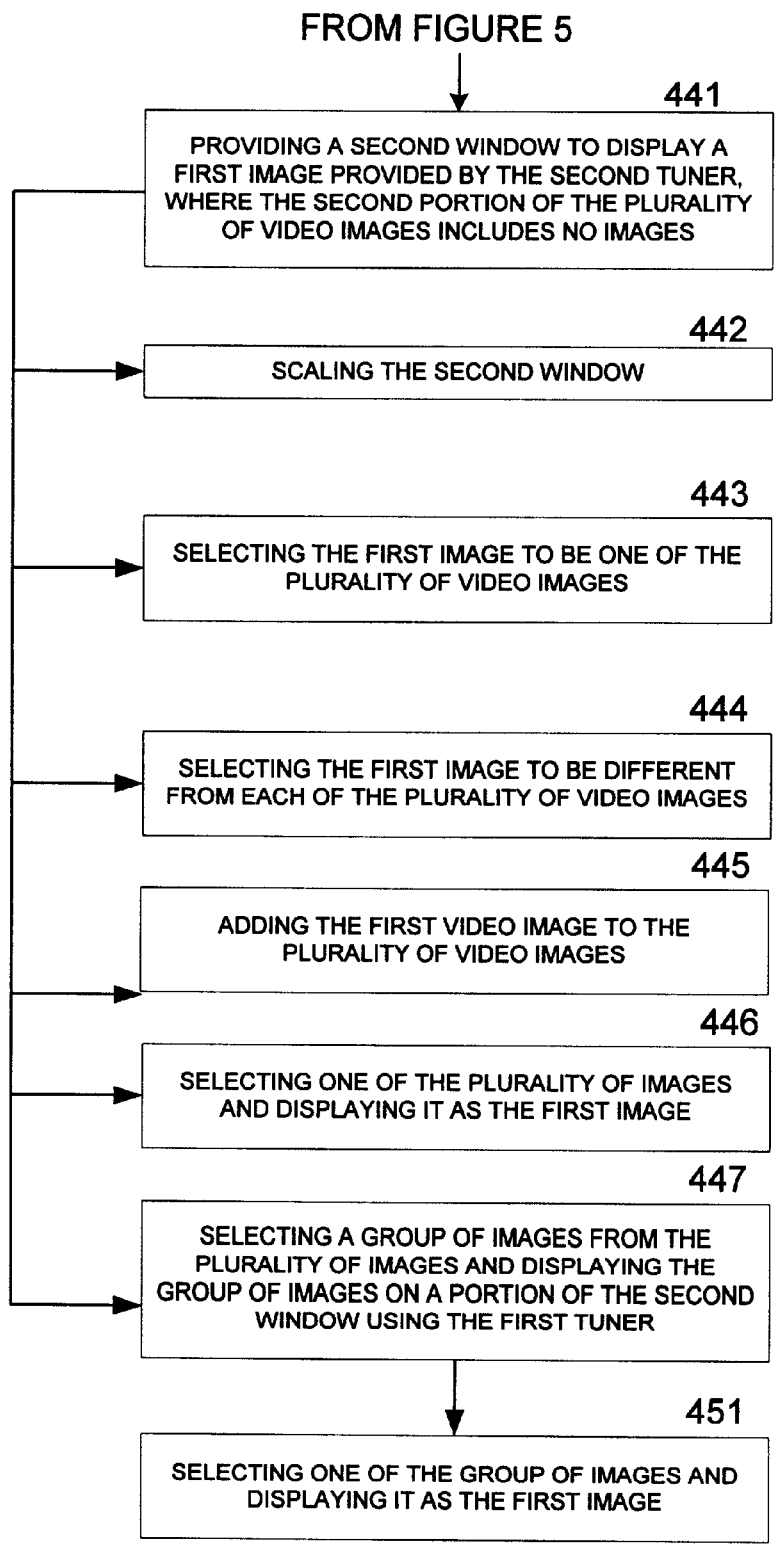

FIG. 9 illustrates yet another method following step 412 of FIG. 5. At step 441 of FIG. 9, a second window is provided to display a first image by the second tuner. Generally, the second portion of the plurality of video images as described with reference to step 411 and 412 would contain no images. This is best understood with reference to FIG. 4.

As illustrated in FIG. 4, a second window 470 is illustrated as displaying an image 440. A first window 480 is currently displaying images 491–499. The first and second portion associated with the window 480 includes a first portion with images 491–499, and a second portion with no images. In other words, the first portion references all nine windows and the second portion represents zero windows. In this embodiment, the second tuner will provide the video image 440 of window 470 as full-motion-video, while the first tuner would periodically update each of the video images 491–499.

Step 442–447 of FIG. 9 can be implemented using the two-window scheme as recited in step 441, and illustrated in FIG. 4. Each of the steps 442–447 can be implemented independently or in combination with each other.

At step 442, the second window 470 is scalable, as is the first window 480 as recited in step 410. This provides the user the advantage of allowing customized window sizes to be used in order to accommodate the user's specific needs at any given time.

At step 443, the first image, image 440, is selected to be one of the images 491–499. In other words, the image being displayed in window 470 could be duplicated as one of the images 491–499. For example, image 492 of window 480 could be a periodically updated image of the full-motion-video image 440.

At step 444, the first image 440 is an unique image from each of the images 491–499.

At step 445 the first image is added to the plurality to video images. In other words, when the image 440 is different than the images 491–499 of FIG. 4, it would be possible to add the image 440 to the plurality of images in window 480. In a specific embodiment, a unique selection criteria, such as a shift-click or a control-click on the image 440 would add the image 440 to the window 480. It should be noted that the window 480 may have varying number of video images. In other words, the images 491–493 of window 480 could merely represent placeholders where video images can be displayed. In this implementation, when the video image 440 is selected for inclusion in the window 480, it merely resides in one of the placeholder locations, such as 494 in the example herein. In other implementations, each of the reference number 491–499 could represent video images currently being updated. In this situation, when the video image 440 is selected for inclusion, the window 480 could be resized in order to accommodate the additional video image. In addition, the images within the window 480 could be resized in order to accommodate the additional images as well.

By allowing a user to use GUI type controls or other user-friendly controls to select an image for its inclusion within a plurality of thumbnail images, and advantage is realized over the prior art, where the number of thumbnail images is often fixed, or one set is not readily changed.

At step 446, one of the plurality of images 491–499 is selected and displayed as the image 440. In this manner, one of the video images being controlled by the first tuner within the window 480 is selected using a predefined selection method, and displayed in the window 470 as the only video image being updated as full-motion-video. As one of ordinary skill in the art will recognize, the various selection methods and combinations and permutations of the techniques herein described with reference to FIGS. 1 and 2 will apply as readily to the two windows of FIG. 4.

At step 447, a group of images is selected from the plurality of images and displayed on a portion of the second window using the first tuner. In the step of 447, the window 470 is made to operate in the manner as the window 230 of FIG. 2. In other words, the images 495, 496, 498, and 499 could be selected from the window 480 then dragged on top of the window 470 displaying the image 440. This selection and drag-drop operation would make the window 470 operate in the manner described with reference to the window 230 of FIG. 2.

Other variation of this implementation are for the window 480 to be closed allowing the user to continue to monitor the select thumbnails within the window 470. As described herein, the thumbnails now residing within the window 470 would be updated by the first tuner, while the full-motion-video of image 440 would continue. At step 451, one of the group of thumbnail images being displayed in the window 470 could be selected and displayed in the location of the image 440. This is consistent with the discussions of FIGS. 1 and 2.

Figure 10:
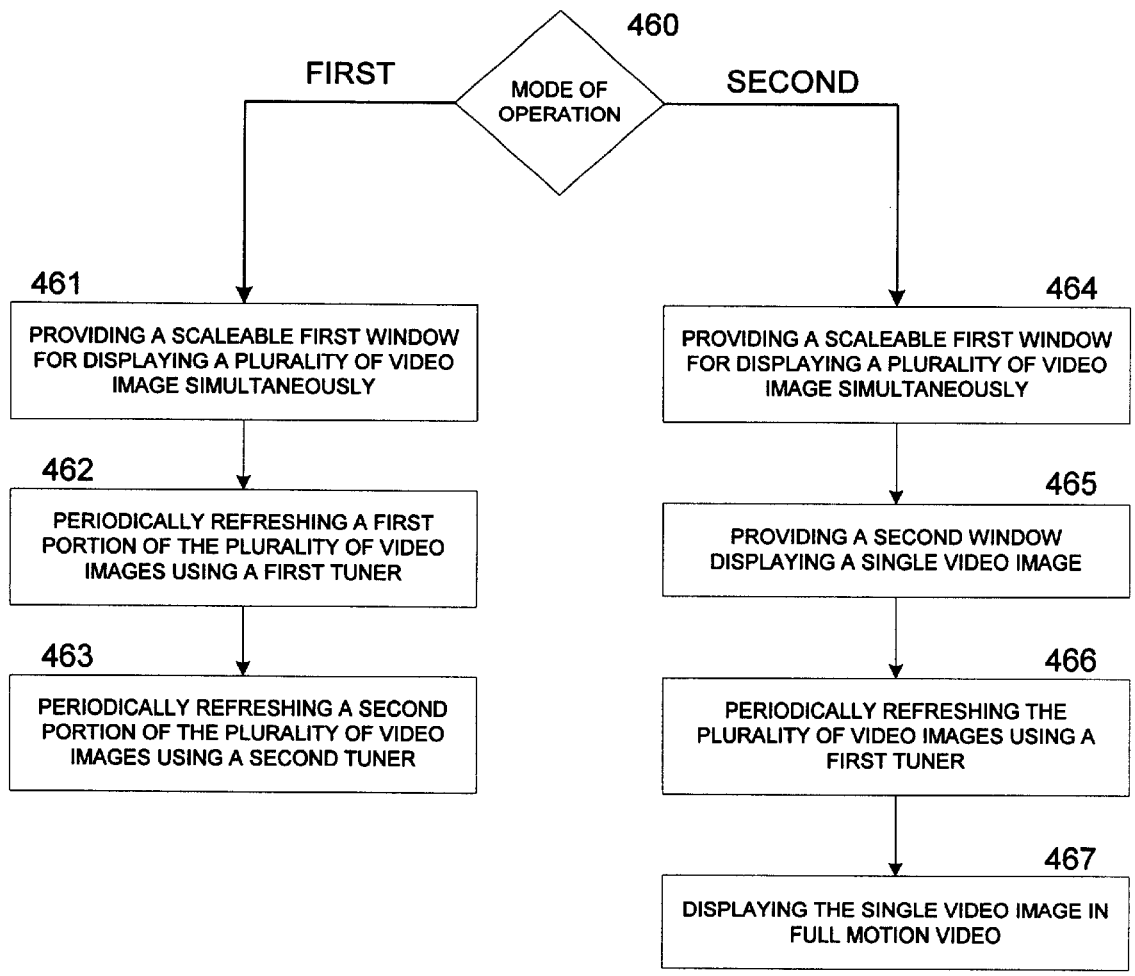

FIG. 10 illustrates a method, wherein from step 412 of FIG. 5, the flow continues to step 460. At step 460, one of two modes is entered. In a first mode of operation, a single window is used to implement the video images as described with reference to FIGS. 1–3. In the second mode of operation, the two windows are used in order to implement present images in accordance with the discussions of FIG. 4. In other words, it would be possible for the user to select back and forth between the single window mode and a dual window mode, as discussed previously with reference to FIG. 4 where a portion of the thumbnail images are dragged and dropped into window 470.

Figure 11:
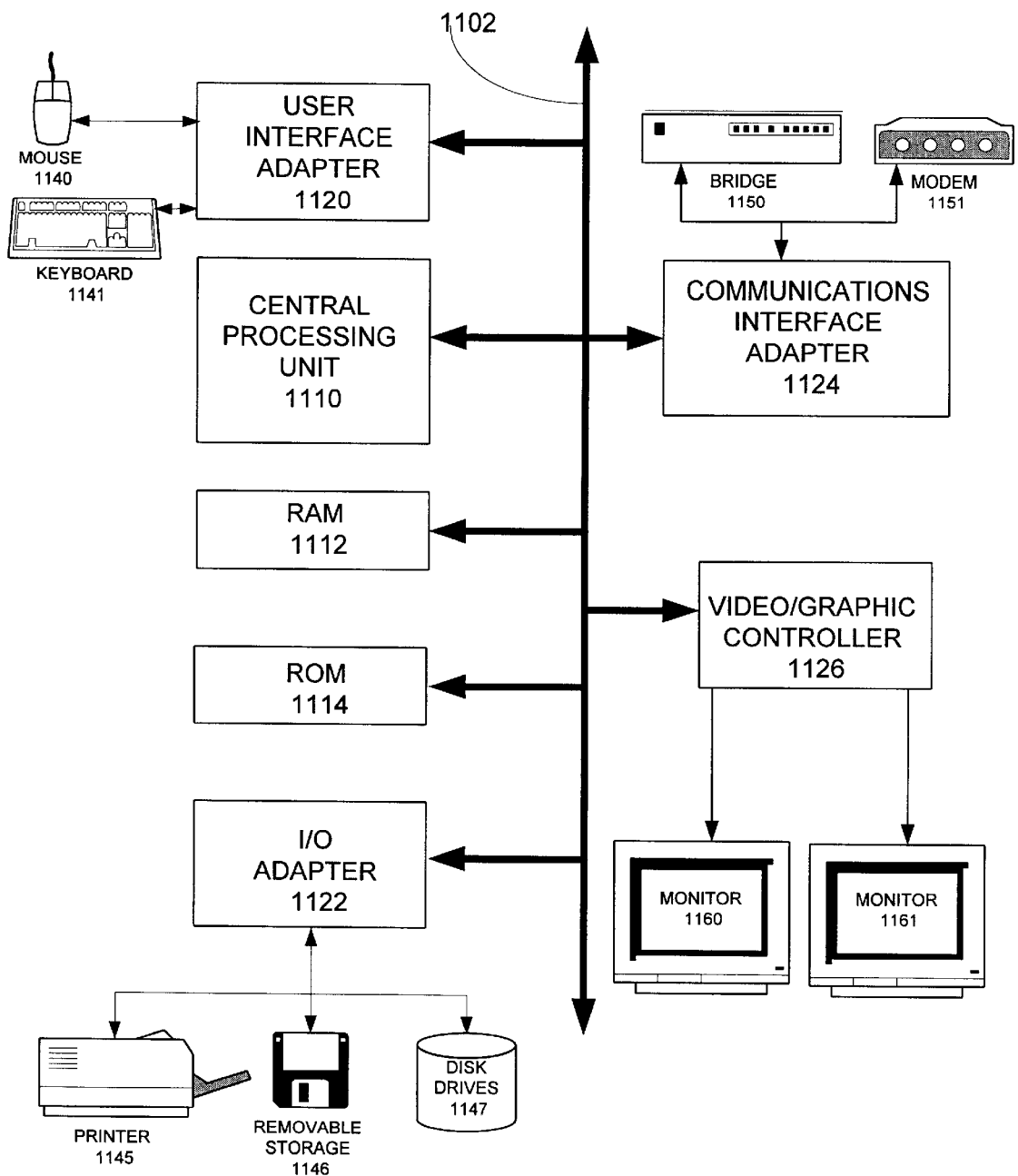
FIG. 11 illustrates a system capable of implementing the methods in accordance with the present invention.

FIG. 11 illustrates a data processing system 1100, such as may be used to implement the present invention, and would be used to implement the various methodologies, or incorporates the various hardware disclosed herein. FIG. 11 illustrates a general purpose computer that includes a central processing unit (CPU) 1110, which may be a conventional or proprietary data processor, and a number of other units interconnected via a system bus 1102. The other portions of the data processing system 1100 include random access memory (RAM) 1112, read-only memory (ROM) 1114, and input/output (I/O) adapter 1122 for connecting peripheral devices, a user interface adapter 1120 for connecting user interface devices, a communications adapter 1124 for connecting the system 1100 to a data processing network, and a video graphics controller 1126 for displaying video and graphic information. In accordance with the present invention, the methods herein could be controlled by the central processing unit 1110, and the video graphic controller 1126. In a specific embodiment, the video graphics controller 1126 would include two or more tuner devices. The two or more tuner devices are capable of controlling a single monitor (e.g. monitor 1160), or multiple monitors (e.g. monitors 1160 and 1161). The tuner devices can reside on a single computer card, separate computer cards, or external to the computer system Such tuner device can be traditional television tuner devices for receiving cable or airwave signals, digital tuners for receiving video on demand, signals that have been digitally encoded, satellite signals, or signals via the Internet whereby the tuner is selected a URL or IP address from which to receive the signal.

The I/O adapter 1122 is further connected to disk drives 1147, printers 1145, removal storage devices 1146, and tape units (not shown) to bus 1102.

The user interface adapter 1120 is connected to a keyboard device 1140 and a mouse 1141. Other user interface devices such as a touch screen device (not shown) may also be coupled to the system bus 1102 through the user interface adapter 1120.

By now it should be apparent that the present invention disclosed unique and useful methods in which to utilize two tuners in association with a processing device. Specifically, the present invention allows for greater flexibility for monitoring video in full motion format as well as in periodically updated format. One of ordinary skill will recognize that various implements, combinations, and permutations of the foregoing disclosure would be anticipated herein. For example, more than two monitors can be used to implement other embodiments of the present invention.

I claim:

1. A method for displaying video, the method comprising the steps of:

providing a first window displaying a plurality of video images simultaneously within the first window, wherein the window size is scalable;

periodically refreshing a first portion of the plurality of video images using a first tuner;

periodically refreshing a second portion of the plurality of video images using a second tuner;

selecting a first video image of the plurality of video images to be a selected image, wherein each other video image of the plurality of video images is an unselected image; and providing full motion video to the selected video using the second tuner.

2. A method of claim 1, wherein the second portion of the plurality of video images is a single window.

3. The method of claim 1, further comprising the step of:

selecting a second video image of the plurality of video images, wherein the second video is image is different than the first video image;

providing audio associated with the second video image.

4. The method of claim 1, wherein the step of providing audio includes providing audio associated with the second video image and the first video image substantially simultaneously.

5. The method of claim 3, wherein the step of providing audio includes providing audio associated with the second video image for a predetermined amount of time.

6. The method of claim 1, further comprising the step of:

selecting a first video image of the plurality of video images to be a selected image, wherein each other video image of the plurality of video images is an unselected image; and providing full motion video to the selected video for a predetermined amount of time using the second tuner and periodically refreshing the unselected images using the first tuner.

7. The method of claim 6, wherein the predetermined amount of time is a fixed amount of time between approximately 3 seconds and approximately 10 seconds.

8. The method of claim 6, wherein the predetermined amount of time is user programmable.

9. The method of claim 1, wherein:

the step of periodically refreshing a first portion of the plurality of video images includes periodically refreshing the first portion at a first rate; and the step of periodically refreshing a second portion of the plurality of video images includes periodically refreshing the second portion at a second rate.

10. The method of claim 9, wherein the first rate and the second rate are user configurable.

11. The method of claim 1 further comprising:
  selecting a first video image of the plurality of video images using one of a first select method and a second select method, wherein each other video image of the plurality of video images is an unselected image; and
  providing full motion video to the selected video using the second tuner and periodically refreshing the unselected images using the first tuner when the selected video was selected using the first select method; and
  providing full motion video to the selected video for a predetermined amount of time using the second tuner and periodically refreshing the unselected images using the first tuner when the selected video was selected using the second select method.

12. The method of claim 1, wherein
  the steps of periodically refreshing a first and second portion of the plurality of video images further include the first and second tuner being on a common computer board.

13. A method for displaying video, comprising the step of:
  providing a first window displaying a plurality of video images simultaneously within the first window;
  periodically refreshing a first portion of the plurality of video images using a first tuner;
  periodically refreshing a second portion of the plurality of video images using a second tuner; and
  providing a second window displaying a first video image, wherein the first video image is provided by the second tuner, and the second portion of the plurality of video images includes no images.

14. The method of claim 13, wherein the second window is scaleable.

15. The method of claim 13, wherein the first video image is substantially the same image as one of the plurality of video images.

16. The method of claim 13, wherein the first video image is different from each of the plurality of video images.

17. The method of claim 13, further comprising the steps of:
  selecting the first video image; and
  adding the first video image to the plurality of video images being simultaneously displayed.

18. The method of claim 17, wherein the step of selecting includes selecting the first video image by dragging a representation of the first video image to the plurality of video images.

19. The method of claim 17, wherein the step of selecting includes selecting the first video image by right clicking on the first video image.

20. The method of claim 17, wherein the step of selecting includes selecting the first video image by clicking on a video button.

21. The method of claim 13, further comprising the steps of:
  selecting one image of the plurality of images; and
  displaying the one image as the first video image.

22. The method of claim 21, wherein the step of selecting includes selecting the one image by dragging a representation of the one image to the second window.

23. The method of claim 13, further comprising the steps of:
  selecting a group of images of the plurality of images, wherein the group includes more than one image; and
  displaying the group of images on a portion of the second window using the first tuner.

24. The method of claim 23, wherein the step of selecting includes selecting the single image by dragging a representation of the single image to the plurality of video images.

25. The method of claim 23, further comprising:
  selecting a specific image of the group images;
  displaying the specific image as the first video image using the second tuner.

26. The method of claim 25, wherein the step of selecting a specific image further includes periodically selecting a different specific image.

27. The method of claim 25, wherein the step of displaying the specific image includes displaying the specific image for a predetermined amount of time.

28. A method of displaying video comprising:
  selecting between a first mode of operation and a second mode of operation; during a first mode of operation:
    providing a first window displaying a plurality of video images simultaneously within the first window, wherein the window size is scalable;
    periodically refreshing a first portion of the plurality of video images using a first tuner; and
    periodically refreshing a second portion of the plurality of video images using a second tuner; and during a second mode of operation:
    providing a first window to display a plurality of video images simultaneously, wherein the first window size is scalable;
    providing a second window displaying a single video image; periodically refreshing the plurality of video images using a first tuner; and
    refreshing the single video image substantially in real time.

29. A system for rendering a plurality of images, the system comprising:
  a processing module; and
  memory operably coupled to the processing module, wherein the memory stores operational instructions that cause the processing module to:
  provide a first window displaying a plurality of video images simultaneously within the first window, wherein the window size is scalable;
  periodically refresh a first portion of the plurality of video images using a first tuner;
  periodically refresh a second portion of the plurality of video images using a second tuner; and
  providing a second window displaying a first video image, wherein the first video image is provided by the second tuner, and the second portion of the plurality of video images includes no images.

30. A system for rendering a plurality of images, comprising:
  a processing module; and
  a memory operably coupled to the processing module, wherein the memory stores instructions that cause the processing module to:
  provide a first window displaying a plurality of video images simultaneously within the first window,
  selecting a first video image of the plurality of video images, wherein each other video image of the plurality of video images is an unselected image, and
  providing full motion video to the selected video for a predetermined period of time using a second tuner and periodically refreshing the unselected images using a first tuner.

* * * * *